(12) United States Patent
Solomon et al.

(10) Patent No.: US 12,095,748 B2
(45) Date of Patent: Sep. 17, 2024

(54) ONE-TIME PADS ENCRYPTION HUB

(71) Applicant: DEFENDER CYBER TECHNOLOGIES LTD., Tel Aviv (IL)

(72) Inventors: Maria Solomon, Barkan (IL); Doron Solomon, Barkan (IL)

(73) Assignee: DEFENDER CYBER TECHNOLOGIES LTD., Tel Aviv (IL)

( * ) Notice: Subject to any disclaimer, the term of this patent is extended or adjusted under 35 U.S.C. 154(b) by 415 days.

(21) Appl. No.: 17/421,284

(22) PCT Filed: Jan. 8, 2020

(86) PCT No.: PCT/IL2020/050030
§ 371 (c)(1),
(2) Date: Jul. 7, 2021

(87) PCT Pub. No.: WO2020/144684
PCT Pub. Date: Jul. 16, 2020

(65) Prior Publication Data
US 2022/0070153 A1 Mar. 3, 2022

Related U.S. Application Data (60) Provisional application No. 62/789,636, filed on Jan. 8, 2019.

(51) Int. Cl.
*H04L 9/40* (2022.01)
*H04L 9/06* (2006.01)
*H04L 9/32* (2006.01)

(52) U.S. Cl.
CPC ........ *H04L 63/0471* (2013.01); *H04L 9/0656* (2013.01); *H04L 9/3239* (2013.01); *H04L 2209/76* (2013.01)

(58) Field of Classification Search
CPC . H04L 63/0471; H04L 9/0656; H04L 9/3239; H04L 2209/76; H04L 63/0428; H04L 63/067; G06F 21/85
(Continued)

(56) References Cited

U.S. PATENT DOCUMENTS

| 5,805,706 A | 9/1998 | Davis |
| 8,160,243 B1 | 4/2012 | Bean |

(Continued)

FOREIGN PATENT DOCUMENTS

| JP | 2008306633 A | 12/2008 |
| JP | 2009159220 A | 7/2009 |

(Continued)

OTHER PUBLICATIONS

Duligall, J. L., Godfrey, M. S., Harrison, K. A., Munro, W. J., & Rarity, J. G. (2006). Low cost and compact quantum key distribution. New Journal of Physics, 8(10), 249. https://iopscience.iop.org/article/10.1088/1367-2630/8/10/249/pdf.

(Continued)

*Primary Examiner* — Jacob Lipman
(74) *Attorney, Agent, or Firm* — The Roy Gross Law Firm, LLC; Roy Gross (57) ABSTRACT

A system comprising: at least one hardware processor; and a non-transitory computer-readable storage medium having stored thereon program instructions, the program instructions executable by the at least one hardware processor to: receive, by a routing hub in a computer network, from an origin node, a communication intended to a destination node, wherein said communication is encrypted with a one-time pad (OTP) associated with said origin node, apply, by said routing hub, to said communication, a customized OTP configured to simultaneously (i) encrypt said communication with said OTP associated with said destination (Continued)

node, and (ii) decrypt said communication with said OTP associated with said origin node, and deliver said communication to said destination node for decrypting said communication with said OTP associated with said destination node.

19 Claims, 6 Drawing Sheets

(58) Field of Classification Search
USPC .......................................................... 713/153
See application file for complete search history.

(56) References Cited

U.S. PATENT DOCUMENTS

| | | | |
|---|---|---|---|
| 8,250,363 | B2 | 8/2012 | Tofts et al. |
| 8,645,716 | B1 | 2/2014 | Dujari et al. |
| 8,745,379 | B2 | 6/2014 | Orsini et al. |
| 9,590,951 | B2 | 3/2017 | Tomkow |
| 10,313,332 | B2 | 6/2019 | Hong et al. |
| 11,483,133 | B2* | 10/2022 | Solomon ............ H04L 63/0464 |
| 2002/0164026 | A1 | 11/2002 | Huima |
| 2004/0034772 | A1 | 2/2004 | Alao |
| 2004/0122975 | A1* | 6/2004 | Lennestal ........... H04L 63/0428 |
| | | | 709/245 |
| 2006/0059343 | A1 | 3/2006 | Berzanskis et al. |
| 2007/0016534 | A1 | 1/2007 | Harrison et al. |
| 2007/0208949 | A1 | 9/2007 | Lu et al. |
| 2008/0168543 | A1 | 7/2008 | von Krogh |
| 2009/0327703 | A1 | 12/2009 | Feudo et al. |
| 2010/0082478 | A1 | 4/2010 | Van Der Veen et al. |
| 2011/0022807 | A1 | 1/2011 | Maeda et al. |
| 2012/0084200 | A1 | 4/2012 | Triana |
| 2013/0138961 | A1 | 5/2013 | Tsuji et al. |
| 2013/0290701 | A1 | 10/2013 | Takenaka et al. |
| 2014/0337615 | A1* | 11/2014 | Tomkow ............. H04L 63/0428 |
| | | | 713/153 |
| 2015/0229621 | A1 | 8/2015 | Kariman et al. |
| 2015/0256391 | A1 | 9/2015 | Hardy et al. |
| 2017/0033925 | A1 | 2/2017 | DeNeut et al. |
| 2017/0180117 | A1 | 6/2017 | Tomkow |
| 2017/0222803 | A1* | 8/2017 | Tanizawa ............ H04L 63/0853 |
| 2017/0279795 | A1 | 9/2017 | Redberg |
| 2018/0063096 | A1* | 3/2018 | Rogson ................ H04L 63/105 |
| 2021/0314143 | A1* | 10/2021 | Conner ................ H04L 9/3239 |

FOREIGN PATENT DOCUMENTS

| | | |
|---|---|---|
| JP | 2011010291 A | 1/2011 |
| JP | 2014078875 A | 5/2014 |
| JP | 2015043619 A | 3/2015 |
| JP | 2015142339 A | 8/2015 |
| JP | 2017139728 A | 8/2017 |
| WO | 1997039552 A1 | 10/1997 |
| WO | 2014182816 A2 | 11/2014 |
| WO | 2015157720 A2 | 10/2015 |
| WO | 2017168201 A2 | 10/2017 |

OTHER PUBLICATIONS

PCT Written Opinion for International Application No. PCT/IL2018/051331, mailed Mar. 19, 2019 6pp.
Tamura, Shinsuke. (2012). Anonymous Security Systems and Applications: Requirements and Solutions. Chapter 2 Anonymous Security Systems and Applications: Requirements and Solutions. 1-251. 10.4018/978-1-4666-1649-3.
PCT International Search Report for International Application No. PCT/IL2020/050030, mailed Mar. 19, 2020, 4pp.
PCT Written Opinion for International Application No. PCT/IL2020/050030, mailed Mar. 19, 2020, 4pp.

* cited by examiner

ONE-TIME PADS ENCRYPTION HUB

CROSS-REFERENCE TO RELATED APPLICATION

This application is a National Phase of PCT Patent Application No. PCT/IL2020/050030 having International filing date of Jan. 8, 2020, which claims the benefit of priority under 35 U.S.C. § 119(e) of U.S. Provisional Patent Application No. 62/789,636, filed Jan. 8, 2019, entitled "ONE-TIME PADS ENCRYPTION HUB". The contents of the above applications are all incorporated herein by reference as if fully set forth herein in their entirety.

BACKGROUND

The invention relates to the field of data encryption.

In cryptography, the one-time pad (OTP) is an encryption technique that is unbreakable but requires the use of a one-time pre-shared key the same size as, or longer than, the message being sent. In this technique, a plaintext is paired with a random secret key (also referred to as a one-time pad). Then, each bit or character of the plaintext is encrypted by combining it with the corresponding bit or character from the pad using one of several functions.

If the key is truly random, never reused in whole or part, and kept secret, it is demonstrably mathematically impossible to decipher the ciphertext without a copy of the pad. Because OTP encryption adds no information to the enciphered text, only random noise, it represents a perfect, unbreakable encryption method.

However, one-time pad cryptography faces several implementation difficulties. First, the secure generation, exchange, and disposal of the OTP material, which must be at least as long as the message, is difficult to achieve. In addition, the possibility of interception, copying, or forensic recovery of a pad by a third party will entirely compromise the security of the method.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in an embodiment, a system comprising: at least one hardware processor; and a non-transitory computer-readable storage medium having stored thereon program instructions, the program instructions executable by the at least one hardware processor to: receive, by a routing hub in a computer network, from an origin node, a communication intended to a destination node, wherein said communication is encrypted with a one-time pad (OTP) associated with said origin node, apply, by said routing hub, to said communication, a customized OTP configured to simultaneously (i) encrypt said communication with said OTP associated with said destination node, and (ii) decrypt said communication with said OTP associated with said origin node, and deliver said communication to said destination node for decrypting said communication with said OTP associated with said destination node.

There is also provided, in an embodiment, a method comprising: receiving, by a routing hub in a computer network, from an origin node, a communication intended to a destination node, wherein said communication is encrypted with a one-time pad (OTP) associated with said origin node; applying, by said routing hub, to said communication, a customized OTP configured to simultaneously (i) encrypt said communication with said OTP associated with said destination node, and (ii) decrypt said communication with said OTP associated with said origin node; and delivering said communication to said destination node for decrypting said communication with said OTP associated with said destination node.

There is further provided, in an embodiment, a computer program product comprising a non-transitory computer-readable storage medium having program instructions embodied therewith, the program instructions executable by at least one hardware processor to: receive, by a routing hub in a computer network, from an origin node, a communication intended to a destination node, wherein said communication is encrypted with a one-time pad (OTP) associated with said origin node; apply, by said routing hub, to said communication, a customized OTP configured to simultaneously (i) encrypt said communication with said OTP associated with said destination node, and (ii) decrypt said communication with said OTP associated with said origin node; and deliver said communication to said destination node for decrypting said communication with said OTP associated with said destination node.

In some embodiments, the routing hub comprises a series of at least two routing hubs, and wherein, with respect to each pair of routing hubs in said series, said applying comprises: applying, by a first routing hub in said pair, to said communication, a first inter-hub customized OTP configured to simultaneously (i) decrypt said communication with an OTP associated with a preceding hop in a route of said communication, and (ii) encrypt said communication with an OTP associated with a second routing hub in said pair; delivering said communication to said second routing hub; applying, by said second routing hub in said pair, to said communication, a second inter-hub customized OTP configured to simultaneously (iii) encrypt said communication with an OTP associated with a subsequent hop in said route of said communication, and (iv) decrypt said communication with said OTP associated with said second routing hub in said pair; and delivering said communication to said subsequent hop.

In some embodiments, each of the hops in said route of said communication is one of: a network node, an end user, a server, a remote server, and an end user.

In some embodiments, each of the customized OTPs represent a computed difference between a pair of OTPs.

In some embodiments, the computer network comprises a plurality of nodes, and wherein each of said nodes stores only an OTP associated with said node.

In some embodiments, the program instructions are further executable to perform network user authentication based, at least in part, on universal hashing.

In some embodiments, at least some of the OTPs are disposed of by overwriting at least a portion thereof using false data.

In some embodiments, at least some of the routing hubs further comprise at least one of: a random numbers generator (RNG), and an automated teller machine configured for dispensing OTPs to said computer network users.

In some embodiments, the OTPs are distributed with the automated teller machine using at least one of: Quantum Key distribution (QKD) communication, and physically secured distribution means.

In some embodiments, the delivering is based, at least in part, on a routing table, and wherein said routing table takes into account an OTP usage metric, and wherein said OTP usage metric is a Key Performance Indicator (KPI) with respect to said computer network.

There is further provided, in an embodiment, a system comprising: at least one hardware processor; and a non-transitory computer-readable storage medium having stored thereon program instructions, the program instructions executable by the at least one hardware processor to: receive, by an OTP hub in a computer network, indication associated with a communication from a first network node to one or more other network nodes, send, by said OTP hub, an OTP to said first network node and to each of said other network nodes, encrypt, by said first node, said communication with said OTP, and transmit, by said first node, said communication to at least one of said one or more other network nodes.

There is further provided, in an embodiment, a method comprising: receiving, by an OTP hub in a computer network, indication associated with a communication from a first network node to one or more other network nodes, sending, by said OTP hub, an OTP to said first network node and to each of said other network nodes, encrypting, by said first node, said communication with said OTP, and transmitting, by said first node, said communication to at least one of said one or more other network nodes.

There is further provided, in an embodiment, a computer program product comprising a non-transitory computer-readable storage medium having program instructions embodied therewith, the program instructions executable by at least one hardware processor to: receive, by an OTP hub in a computer network, indication associated with a communication from a first network node to one or more other network nodes, send, by said OTP hub, an OTP to said first network node and to each of said other network nodes, encrypt, by said first node, said communication with said OTP, and transmit, by said first node, said communication to at least one of said one or more other network nodes.

In some embodiments, the at least one of said one or more network nodes further decrypts said communication with said OTP.

In some embodiments, the indication is received from any of said network nodes.

In some embodiments, each of the network nodes stores an authentication OTP, and wherein said authentication OTP is configured for use in connection with a two-step user authentication of said network node.

In some embodiments, the OTP is disposed of by overwriting at least a portion thereof using false data.

In some embodiments, the OTP hub further comprises at least one of a random numbers generator (RNG), and an automated teller machine configured for dispensing OTPs to said network nodes.

In some embodiments, the OTP is distributed with the automated teller machine using at least one of Quantum Key distribution (QKD) communication, and physically secured distribution means.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Disclosed herein are a system, method, and computer program product for secure routing of messages between two or more users, using one-time pad (OTP) cryptography.

As noted above, OTP cryptography typically faces significant practical difficulties. First, in order to provide absolute cryptographic stability, OTPs must have truly random encryption key, be equal in size with a message to be encrypted, never reused, and disposed of properly immediately after use. Current random number generators can produce random key material of sufficient quality for use in OTP cryptography. In addition, as a practical matter, modern computer systems can store and handle the requisite amounts of random key data.

However, the security of an OTP-based cryptography system continues to depend on secure pad handling and distribution, because interception and copying of a pad by a third party will compromise the security of the method. This problem is further compounded with any increase in the number of communicants in a network, because each sender/recipient pair must maintain a unique pad shared only between the two of them. As the number of network users increases, the number of unique pads needed increases by power of two, so that at a certain point, the number of pads needed to be retained by each network constituent becomes unmanageable.

Accordingly, in some embodiments, the present invention provides for a centralized OTP encryption scheme wherein one or more OTP hubs are responsible for routing encrypted messages among a plurality of network users. In some embodiments, an OTP encryption scheme of the present invention comprises encrypting each bit or character of the plaintext by combining it with a corresponding bit or character from a pad, using at least one of modular addition, any table exchange group that is an injective or one-to-one transformation function, and/or any other homomorphic function or homomorphic encryption function.

In some exemplary embodiments, the OTP encryption scheme described herein can be utilized to enable OTP-encrypted communication between multiple sender/receiver end users, for enabling OTP encrypted video/audio conferencing, email exchange, file exchange, multi-party digitized telephone voice communications, gaming, etc. In other exemplary embodiments, the OTP encryption scheme described herein can be used to exchange messages utilizing push and pull network communication technologies, including but not limited to unicasting, multicasting, and broadcasting messages, such as SMS, Instant Messages, and the like. In yet other exemplary embodiments, such communication may be enabled via wired and wireless networks and via any number and any kind of gateways and proxies. In some embodiments, there could be any number of OTP hubs geographically distributed in various locations and regions. In some embodiments, one or more OTP hubs may be cloud-based OTP hubs. In some embodiments, any type of communication channel may be encrypted using the disclosed invention, e.g., end-to-end communication tunnels, publish/subscribe protocols-based communications, TCP/UDP-based communications, as well as non-TCP communications. The disclosed encryption scheme can also be used in addition to any other data protection technology, such as TLS/SSL and the like.

In some embodiments, an OTP hub of the present invention may be implemented in hardware only, software only, or a combination of both hardware and software. For example, the OTP hub may be a personal computer, a tablet, a smart phone, an embedded device, a hand-held device coupled with a radio module, a concealed device, a device having an electronic circuitry, and the like. In some embodiments, the OTP hub may comprise one or more hardware processors, and a non-transitory computer-readable storage device. In various embodiments, an OTP hub may comprise one or more dedicated hardware devices, one or more software modules, and/or may form an addition or extension to an existing device. In some embodiments, the centralized OTP hub comprises more than one separate hardware devices, wherein no single hardware device retains all pads necessary to decrypt any message.

In some embodiments, the one or more dedicated hardware devices may be located in different locations. The storage medium of an OTP hub may have encoded thereon software instructions or components configured to operate the one or more hardware processors. In some embodiments, the software components may include an operating system, including various software components and/or drivers for controlling and managing general system tasks (e.g., memory management, storage device control, power management, etc.), and facilitating communication between various hardware and software components. In some embodiments, the program instructions are segmented into one or more software modules, which may comprise, e.g., an encryption/decryption module, a communications module, and a user interface module.

In some embodiments, by centralizing pad distribution and retention in the OTP hubs, the present invention also avoids the need to distribute multiple pads to end users, thereby potentially exposing pads to hostile misappropriation, and compromising overall system security. Thus, system-wide pads need only be distributed to a limited number of OTP hubs, which may be handled through secure electronic and/or physical distribution.

In some embodiments, the present invention provides for a two-layer OTP handling arrangement, wherein one or more routing OTP hubs are solely responsible for message encryption/decryption and routing among network users, while other one or more network nodes, such as a local or external OTP hub, and/or a cloud-based server, etc., are responsible for warehousing and/or generating appropriate pads for use by the one or more routing OTP hubs.

In some embodiments, pad generating may be done on-demand, based on requests from one or more users and/or routing OTP hubs of the network. In some embodiments, such two-layer arrangement may be configured for secure routing of messages among one or more clusters of users in remote networks.

In some embodiments, the present invention provides for a peer-to-peer OTP encryption scheme among a plurality of network users.

In some embodiments, the network of the present invention provides for multiple possible encrypted messaging routes between each sender/recipient pair, to ensure redundancy in case of hub failure or malfunction.

In some embodiments, the present invention further provides for optimizing OTP-based message routing among a plurality of users and/or networks, based on minimizing an OTP usage metric and/or additional routing parameters. In some embodiments, the OTP usage metric can also be used also as a Key Performance Indicator (KPI) for operating issues.

In some embodiments, the present invention further provides for one or more of random number generation, message authentication, secure OTP keys distribution to end users, and/or secure OTP key disposal.

A potential advantage of the present invention is, therefore, in that it provides for a practical real-world OTP-based encryption scheme, which is optimized for local and/or remote multi-user environments, while ensuring secure pad handling and distribution.

Figure 1A:
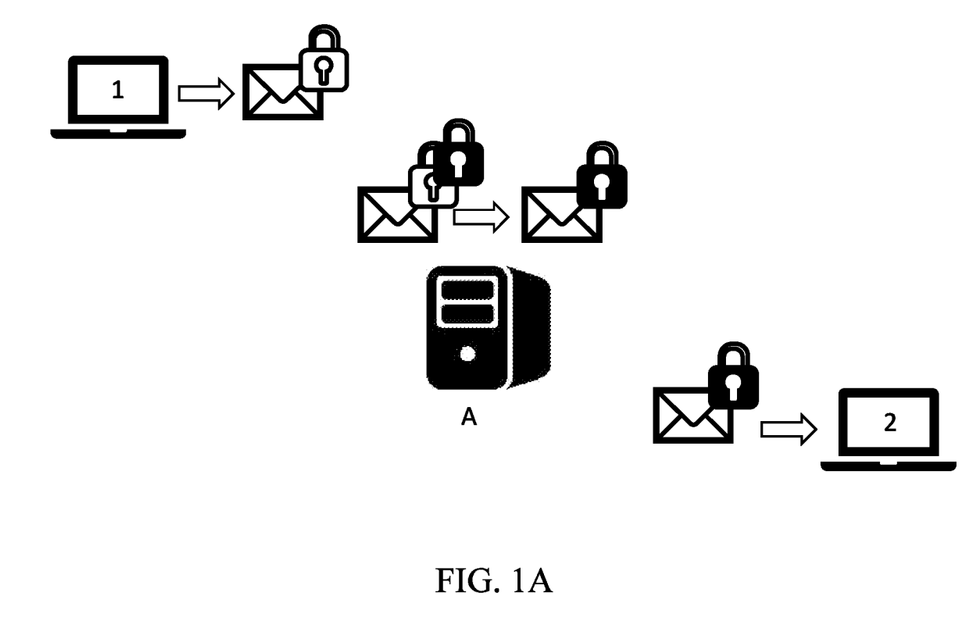
FIG. 1A illustrates an exemplary centralized OTP encryption scheme according to an embodiment.

FIG. 1A illustrates an exemplary centralized OTP encryption scheme according to an embodiment. An OTP hub A retains corresponding pads associated with each network user, e.g., sender 1 and recipient 2. OTP hub A receives a message from sender 1 encrypted with the sender pad. OTP hub A then encrypts the message with the recipient pad, and removes the sender pad, in each case using the corresponding pads retained by Hub A, and transmits the message to the recipient. Thus, sender 1 and recipient 2 can communicate through Hub A, without each having to retain both of their respective pads.

In some embodiments, OTP hub A may be configured for first encrypting a message with the recipient pad, and only then removing the sender pad, so as to ensure that a message is never retained in an unencrypted state by any network constituent.

As noted above, in some embodiments, an OTP hub of the present invention, such as OTP hub A, may be implemented on a server. In some embodiments, such server may comprise one or more physical devices, and/or distributed systems having more than one hardware processor and associate storage media. In some embodiments, one or more OTP hubs may be implemented on a single hardware device, and/or one or more OTP hubs may be implemented more than one separate hardware devices, wherein no single hardware device retains all pads necessary to decrypt any message.

Figure 1B:
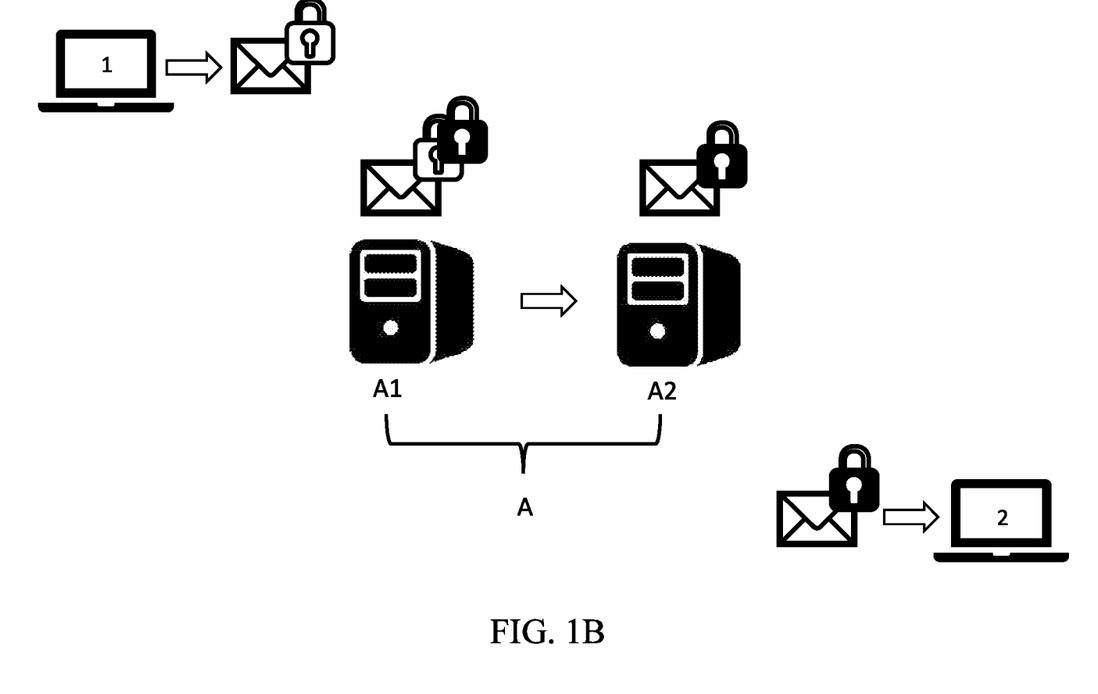
FIG. 1B illustrates an exemplary centralized OTP encryption scheme wherein an OTP hub is implemented in two or more physical devices, according to an embodiment.

FIG. 1B illustrates an exemplary centralized OTP encryption scheme wherein OTP hub A is implemented in two or more separate hardware devices, e.g., parts A1 and A2, wherein each part retains a different set of end user pads. For example, part A1 may receive a message encrypted with a sender pad, and encrypt the message with a recipient pad. The message is then transmitted to a second part A2, where the sender pad is removed and the message is transmitted to the recipient with only the recipient pad. This configuration offers increased security because no single physical device holds all pads necessary to decrypt any message. In addition, as noted above, the message itself remains encrypted at all times with at least one pad as it is forwarded through the separate hardware devices.

Figure 1C:
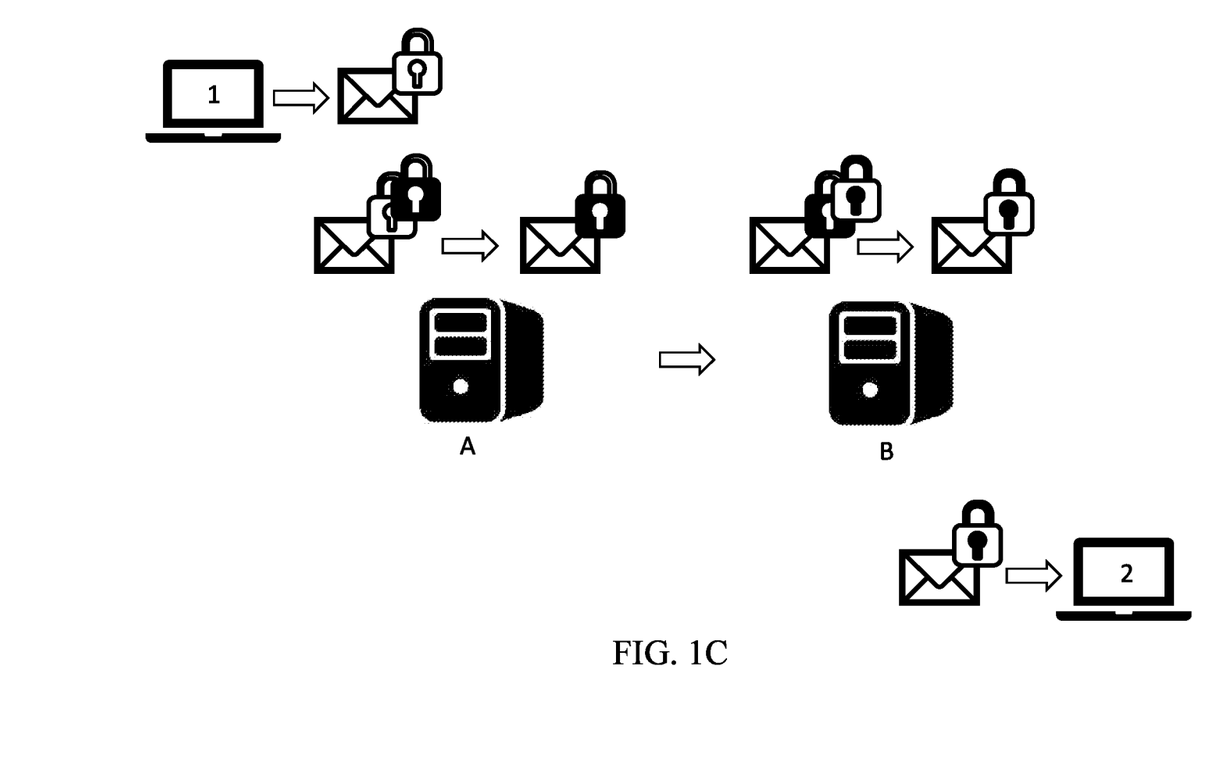
FIG. 1C illustrates an exemplary centralized OTP encryption scheme comprising two or more separate OTP hubs, according to an embodiment.

FIG. 1C illustrates an exemplary centralized OTP encryption scheme comprising two or more separate OTP hubs. In this configuration, a message may be routed through multiple hubs, e.g., hubs A and B. Each inter-hub hop involves encrypting the message with an inter-hub pad and only after that removing a previous pad. For example, the hop from hub A to hub B involves encrypting the message with an inter-hub pad unique to the A-B pair, and only after that removing the sender pad. Once the message reaches the final hub in the chain (in this case, hub B), the message is encrypted with the recipient pad, and the most recent inter-hub pad is subsequently removed.

In all configurations of the present invention, where a message transmission is to be re-encrypted with a different pad, the OTP hubs or any equivalent server, network constituent, and/or network node is configured for first encrypting the transmission with a subsequent pad, before removing an existing pad, such that the transmission remains subject to at least one layer of encryption at all times.

In some embodiments, the present invention provides for customized 'delta' pads whose application to the transmission has the effect of encrypting the transmission with a subsequent pad and removing an existing pad.

In some embodiments, the encryption/removal is simultaneous. In some embodiments, the encryption/removal is sequential, wherein the 'delta' pad first encrypts the transmission with a subsequent pad, and then removes an existing pad. In some embodiments, the sequential encryption and removal are performed instantaneously. In some embodiments, the application of the 'delta' pad ensures that the transmission remains subject to encryption at all times. In some embodiments, customized 'delta' pads are generated on-demand by a node of a network, in response to a request and/or indication related to a transmission between users of the network.

Figure 2A:
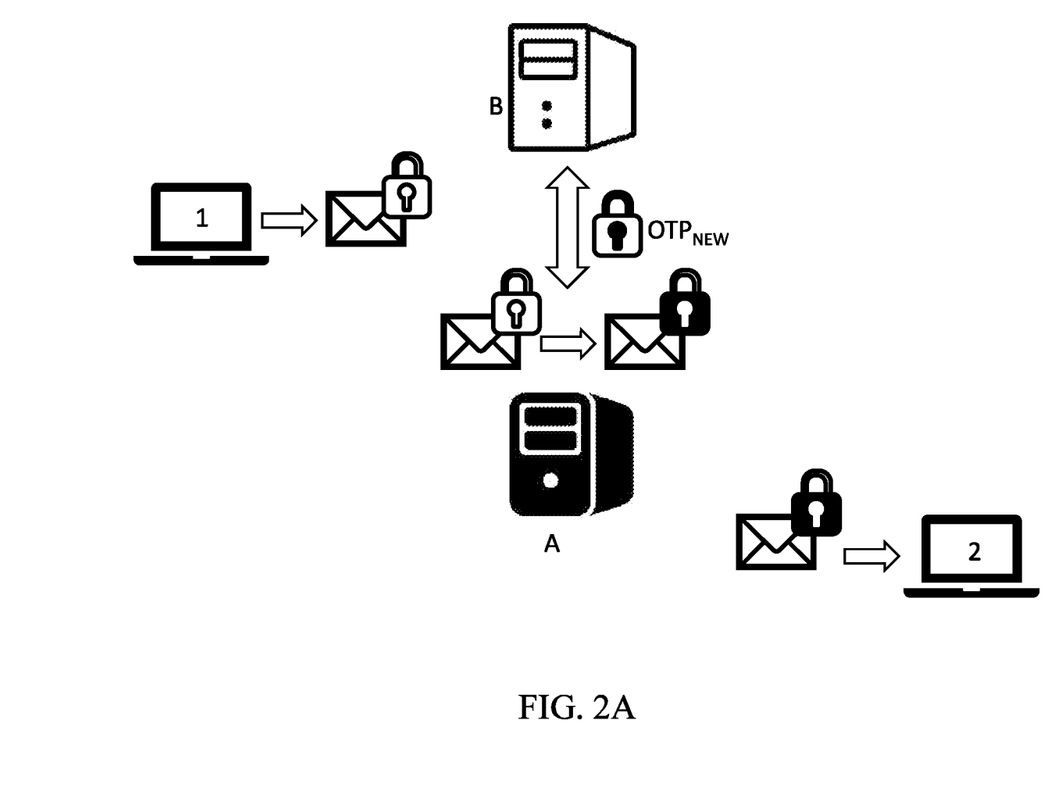
FIGS. 2A-2B illustrate an encryption scheme comprising a two-layer OTP hub arrangement, according to an embodiment.

With reference to FIG. 2A, in some embodiments, a centralized OTP encryption scheme of the present invention may be configured as two-layer arrangement, wherein one or more routing OTP hubs are responsible for message encryption/decryption and routing among network users, and another network node, such as a local or external OTP hub, and/or a cloud-based server, etc., is responsible for warehousing and/or generating appropriate pads for use by the one or more routing OTP hubs. In some embodiments, pad generating may be done on-demand for a specific combination of sender/one or more recipients, based on requests from one or more users and/or routing OTP hubs of the network. In some embodiments, such two-layer arrangement may be configured for secure routing of messages among one or more clusters of users in remote networks.

In some embodiments, the two-layer arrangement may provide several benefits, including increased pad security. This may be achieved by ensuring separation between network routing hubs and pad handling hubs. This means, for example, that pads cannot be misappropriated through intrusion into the network routing hubs, which handle network communications and are therefore more susceptible to intrusion attempts. Conversely, the OTP hubs do not represent regular network access points, and therefore are less susceptible to intrusion attempts. In addition, in most cases, the pads created by the OTP hubs will be customized 'delta' pads configured for combined encryption/decryption of a message, and therefore cannot be used for decryption alone.

Accordingly, when sending a message from a user 1 to a user 2, the following steps may be carried out, with continued reference to FIG. 2A:

(i) User 1 sends a message encrypted with a user 1 pad to routing OTP hub A, wherein the message is intended for user 2;
(ii) Network node B is informed of the intended message from user 1 to user 2, e.g., via routing OTP hub A and/or any other network user, node, or constituent;
(iii) Network node B generates and sends to routing OTP hub A a customized 'delta' denoted $OTP_{NEW}$ for the intended transmission, which, when applied to the transmission, will have the effect of simultaneous or sequential application of the user 2 pad and removal of the user 1 pad (e.g., the 'delta' pad may be described as $OTP_{NEW} = OTP_{USER\ 2} - OTP_{USER\ 1}$.
(iv) Routing OTP hub A receives $OTP_{NEW}$ and applies it to the transmission, and then sends the transmission to user 2, such that the transmission is encrypted only with a user 2 pad, wherein user 2 is able to decrypt the transmission using its own pad.

In some embodiments, a 'delta' pad of the present invention may work as follows: given a massage A {0x2A}, $OTP_1$ {0x39}, and $OTP_2$ {0xB6}, then, if the encryption operation is done by bitwise XOR, the encryption and decryption is the same operation of bitwise XOR. Therefore, message A encrypted with $OTP_1$ may be represented as:

$$A_1 = A \oplus OTP_1 = \{0x2A\} \oplus \{0x39\} = \{0x13\}.$$

Similarly, message A encrypted with $OTP_2$ may be represented as:

$$A_2 = A \oplus OTP_2 = \{0x2A\} \oplus \{0xB6\} = \{0x9C\}$$

As demonstrated below, this result is mathematically equivalent to having message $A_1$ encrypted with $OTP_2$, which encrypted message is then further decrypted (encrypted) with $OTP_1$:

$$A_2 = ((A_1 \oplus OTP_2) \oplus OTP_1) = ((\{0x13\} \oplus \{0xB6\}) \oplus OTP_1) = (\{0xA5\} \oplus \{0x39\}) = \{0x9C\}.$$

This is further mathematically equivalent to having message $A_1$ simply encrypted with a customized 'delta' pad, $OTP_{NEW}$, which is represents the difference between $OTP_1$ and $OTP_2$:

$$OTP_{NEW} = OTP_2 - OTP_1 = OTP_2 \oplus OTP_1 = \{0x39\} \oplus \{0xB6\} = \{0x8F\}.$$

Thus, if message $A_1$ is encrypted with $OTP_{NEW}$, then the result is as expected, equal to simply encrypting message A with $OTP_2$ in the first place:

$$A_1 \oplus OTP_{NEW} = \{0x13\} \oplus \{0x8F\} = \{0x9C\}.$$

In some embodiments, this method can be applied not only by using bitwise XOR operation, but, for example, by a Vernam cipher-like operation. If the symbols are bytes and the operation is a cyclic shift of the symbols as a set of symbols with rising order, when encryption is cyclic shifting to one direction and decryption is shifting in the other direction. That means that encryption is adding 256 and then modulo 256, and decryption is adding 256 minus the value of the symbol and then modulo 256. Therefore, with A {0x2A}, $OTP_1$ {0x39}, and $OTP_2$ {0xB6}, then:

$$A_1 = \mathrm{mod}(A + OTP_1, 256) = \mathrm{mod}(\{0x2A\} + \{0x39\}, 256) = \{0x63\}$$

$$A_2 = \mathrm{mod}(A + OTP_2, 256) = \mathrm{mod}(\{0x2A\} + \{0xB6\}, 256) = \{0xD0\}$$

As demonstrated below, this result is mathematically equivalent to having message $A_1$ encrypted with $OTP_2$, which encrypted message is then further decrypted with $OTP_1$:

$$A_2=\text{mod}(\text{mod}(A_1+OTP_2,256)+256-OTP_1,256)==\text{mod}(\text{mod}(\{0x63\}+\{0xB6\},256)+256-\{0x39\},256)=\{0xD0\}.$$

This is further mathematically equivalent to having message $A_1$ simply encrypted with a customized 'delta' pad, $OTP_{NEW}$, which represents the difference between $OTP_1$ and $OTP_2$:

$$OTP_{NEW}=OTP_2-OTP_1=\text{mod}(OTP_2+256-OTP_1,256)=\text{mod}(\{0xB6\}+256-\{0x39\},256)=\{0x7D\}.$$

Thus, if message $A_1$ is encrypted with $OTP_{NEW}$, then the result is, as expected, equal to simply encrypting message A with $OTP_2$ in the first place:

$$\text{mod}(A_1+OTP_{NEW},256)=\text{mod}(\{0x63\}+\{0x7D\},256)=\{0xD0\}.$$

In an exemplary embodiment, for added security, network node B in FIG. 2A may further apply an inter-hub pad to $OTP_{NEW}$, such that the transmission between network node B and routing OTP hub A is further encrypted with another layer of encryption unique to the A-B pair.

Figure 2B:
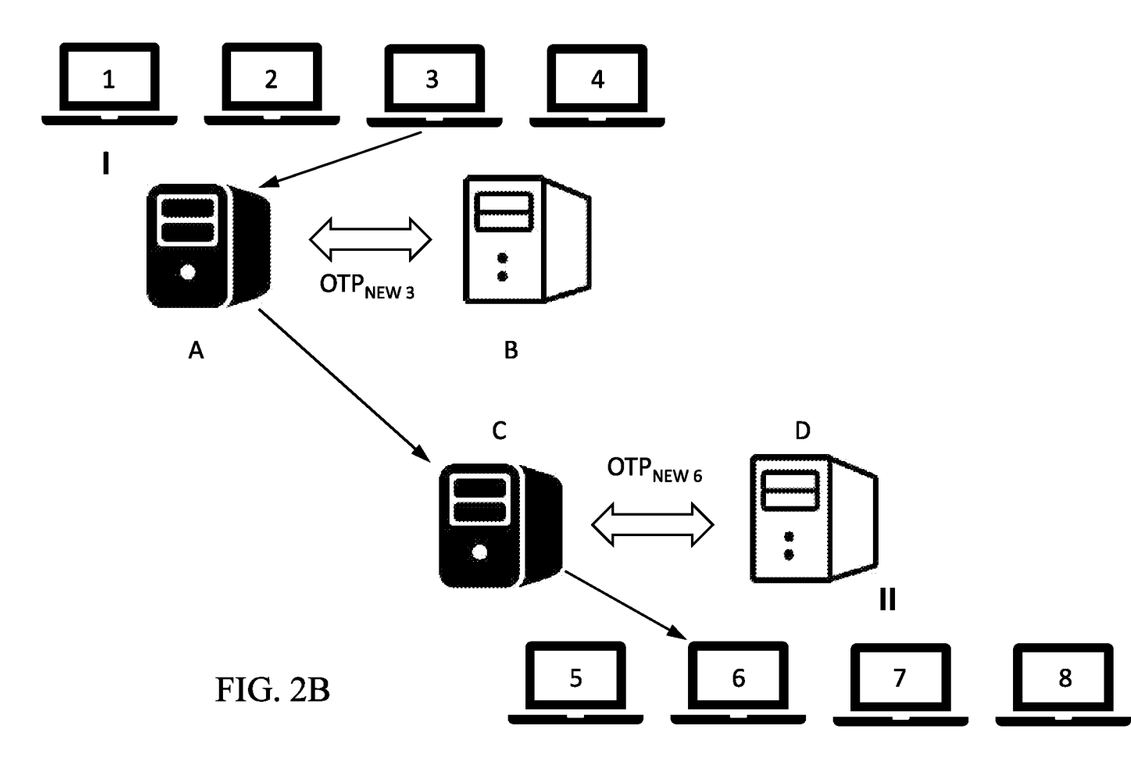

FIG. 2B illustrates a centralized OTP encryption scheme of the present invention configured for secure transmission of messages across clusters of users in remote networks, using a two-layer arrangement similar to the one shown in FIG. 2A. Accordingly, when sending a message from a user 3 to a user 6, the following steps may be carried out:

(i) User 3 in a first cluster I sends a message encrypted with a user 3 pad through routing OTP hub A of cluster I, wherein the message is intended for user 6 in a second cluster II;

(ii) A first network node B associated with cluster I is informed of the intended message from user 3 to user 6, e.g., via routing OTP hub A of cluster I, and/or any other network user, node, or constituent;

(iii) Network node B generates and sends to routing OTP hub A a unique pad $OTP_{NEW\ 3}$ for the intended transmission, which, when applied to the transmission, will have the effect of simultaneously or sequentially applying an inter-cluster pad for a secure transmission to routing OTP hub C of cluster II and removing the user 3 pad (e.g., the unique pad may be described as $OTP_{NEW\ 3}=OTP_C-OTP_{USER\ 3}$);

(iv) Routing OTP hub A receives $OTP_{NEW\ 3}$ and applies it to the transmission, and then sends the transmission to routing OTP hub C of cluster II;

(v) A second network node D associated with cluster II then prepares and sends to routing OTP hub C a second unique pad $OTP_{NEW\ 6}$ for the intended transmission, which, when applied to the transmission, will have the effect of simultaneously or sequentially applying the user 6 pad and removing $OTP_C$ (e.g., $OTP_{NEW\ 6}=OTP_{USER\ 6}-OTP_C$); and (vi) Routing OTP hub C receives the $OTP_{NEW\ 6}$ and applies it to the transmission, and then sends the transmission to user 6, such that the transmission is encrypted only with a user 6 pad.

In an exemplary embodiment, for added security, network nodes B and D may further apply inter-hub pads to $OTP_{NEW\ 3}$ and $OTP_{NEW\ 6}$, respectively, such that the transmissions between network node B and routing OTP hub A, and between network node D and routing OTP hub C, are further encrypted with another layer of encryption unique to the specific pairs.

Figure 3:
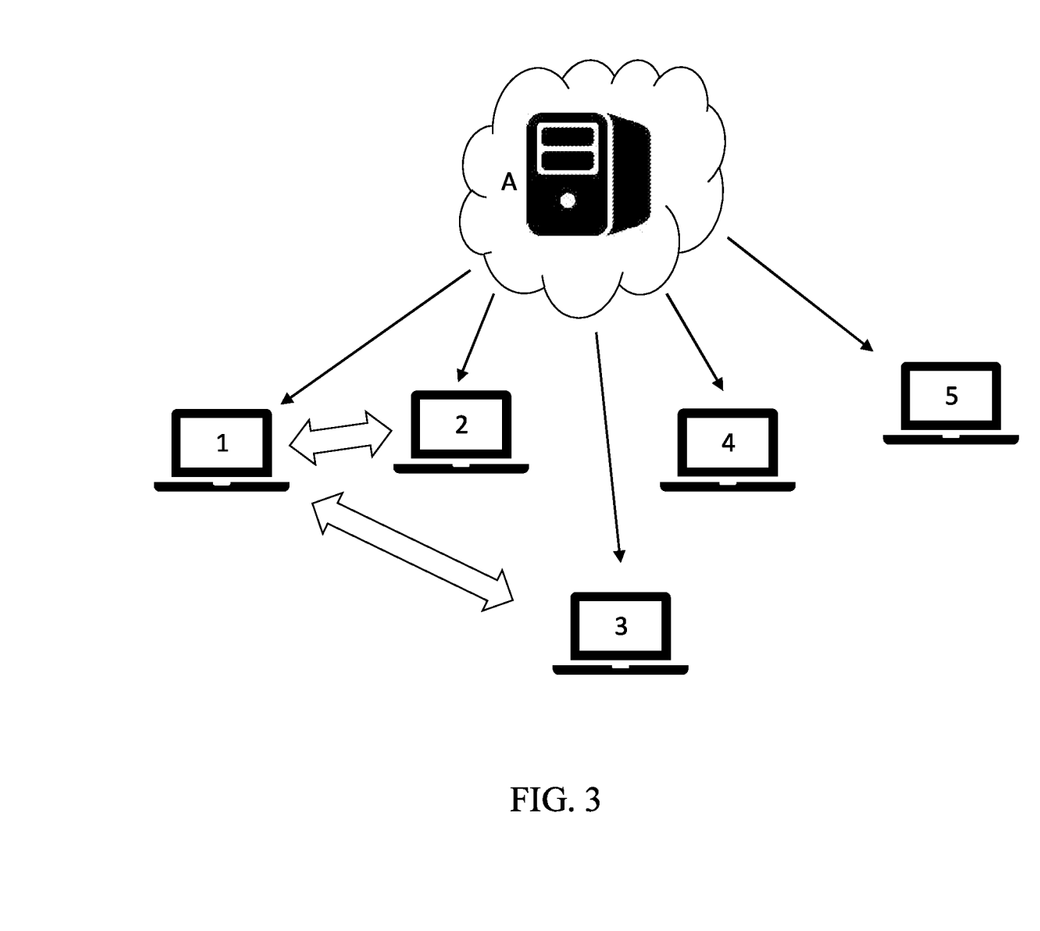
FIG. 3 illustrates a peer-to-peer encryption network, according to an embodiment.

In some embodiments, the present invention may be configured for providing a peer-to-peer OTP encryption scheme among a plurality of network users, wherein secure messages may pass directly between pairs of end users, without being routed through one or more OTP hubs. The term "directly" means either direct transmission of data between the devices of the users, without any intermediary device, or, more commonly, transmission from the users over a network—wherein the servers the transmission passes through are not OTP hubs but rather standard network nodes. In some embodiments, an on-demand pad may be generated and/or stored by, e.g., an OTP hub Of the present invention, and provided to the relevant end users to facilitate the secure transmission. Namely, the provision of an OTP may be by a hub that does not participate in the actual transmission of an encrypted message between the parties. In some embodiments, the OTP hub may be a local network constituent, may be part of a remote network, or may be a cloud-based OTP hub.

Accordingly, when sending a message from a user 1 to one or more other network users, e.g., users 2 and 3, the following steps may be carried out:

(i) OTP hub A, which may be, e.g., cloud-based, is informed of the intended message from user 1 to user 2, e.g., via any network user, node, or constituent;

(ii) OTP hub A generates an appropriate pad $OTP_X$ and sends it to users 1, 2 and 3 as an encrypted message; and (iii) User 1 may then transmit an encrypted message using $OTP_X$ to users 2 and 3, which may subsequently decrypt the received message using $OTP_X$.

In some embodiments, a centralized OTP encryption schemes of the present invention may provide for a plurality of OTP hubs, wherein each OTP hub is provided with a specified set of end user pads associated at least some end users of the network. Such multi-hub networks may offer multiple routing paths between each pair of users, and as such provide redundancy in case of, e.g., hub failure, and/or selection of best route to, e.g., optimize hub pad usage. In some embodiments, one or more routing algorithms may be implemented to select appropriate and/or optimized routes. In some embodiments, the OTP usage metric can also be used as KPI for operating issues.

In some embodiments, by increasing the number of hubs in the network and/or the number of pads per hub, there is created greater redundancy of routing options within the network.

In some embodiments, two or more hubs holding pads for the same user may be provided with different versions of the user's pad, so as to avoid having different hubs retaining the same pads.

In some embodiments, two or more secure networks of the present invention may provide for inter-network communications by providing each hub in each network with a shared pad. In some embodiments, each hub in a network may retain a different shared pad, so as to avoid duplication of shared pads across multiple hubs. The shared pad can be stored in separate dedicated hub or hubs (e.g., for redundancy purposes) for inter network connectivity, or can be stored by the regular hubs.

Message Routing Optimization

In some embodiments, as noted above, the present invention provides for a communications network layout with a plurality of optional message routes through one or more hubs within a network, and/or through one or more remote networks, from sender to recipient. In some embodiments, this may offer redundancy in case of, e.g., hub failure.

In some embodiments, the present invention may be further configured for optimizing message routing according to specified criteria, including, but not limited to, based on an OTP usage metric. In some embodiments, additional and/or other optimization criteria may be used, including network bandwidth, network storage capacity, network delay, OTP hub hop count, path real usage cost, load, MTU (maximum transmission unit), reliability, and/or communication cost. In some embodiments, the OTP usage metric can also be used as KPI for operating issues.

Because OTPs are a depleting resource, every transmission between hubs (FIGS. 2A-2B), and/or between network clusters (FIG. 3), involves the use and depletion of at least portions of one or more OTPs. Accordingly, in some embodiments, optimized route selection is configured for minimizing OTP usage along the route, e.g., through minimizing the number of hops among hubs and/or network clusters. In some embodiments, the present invention may be configured for calculating a route from sender to recipient having the smallest total OTP usage metric. In some embodiments, the OTP usage metric can also be used as KPI for operating issues.

By way of background, in the context of a computer networks, message routing is the process of selecting a path for traffic within the network, or across multiple networks. In packet switching networks, routing usually involves forwarding packets on the basis of routing tables, which maintain a record of the routes to various network destinations. A routing table, or routing information base (RIB), is a data table stored in a network node, such as a router, a networked computer, or a server, and lists the routes to particular network destinations and associated metric, such as distances, cost of operation, or delays. The routing table contains information about the topology of the network immediately around it, constructed using routing protocols based on, e.g., manual entries during network initialization. For example, a routing table may contain network/next hop associations which tell a router that a particular network destination can be optimally reached by sending the packet to a specific router that represents the 'next hop' on the way to the final destination. In some cases, one or more remote networks may be added to a routing table during initialization or through dynamic routing protocols.

However, because in the present case a routing optimization metric involves a dynamic depleting resource, routing optimization cannot be determined based on static routing tables. Accordingly, in some embodiments, a centralized encryption scheme of the present invention may be configured for producing a routing table, wherein each network node, such as an OTP hub and/or end user, may be configured for gathering information about all the other network nodes to which it can connect. In some embodiments, each network node may then independently assemble this information into a routing table and/or network map. In some embodiments, based on these individual routing tables, each network node may independently determine a least-cost path from itself to every other node, using one or more known shortest paths algorithms, such as a distance vector algorithm (e.g., Bellman-Ford algorithm, Dijkstra's algorithm, Viterbi algorithm), a list short paths algorithm, a path vector protocol, and the like. The result may be a tree graph rooted at the current node, such that the path through the tree from the root to any other node is the least-cost path to that node.

This tree then serves to construct the routing table, which specifies the best next hop to get from the current node to any other node.

In some embodiments, a communication network off the present invention may provide or a centralized message routing control, which may be used to manage the routing in the network or any part of it. In such a case, the OTP usage metric determined by one or more network nodes may be communicated to the control function, which may then determine routing paths. In some embodiments, the OTP usage metric can also be used as KPI for operating issues.

In some embodiments, an optimized route may be determined based solely on a pad usage matric, and/or represent a combination of multiple parameters, including, but not limited to bandwidth, network delay, hop count, path real usage cost, load, MTU (maximum transmission unit), reliability, and/or communication cost. In some embodiments, the OTP usage metric can also be used as KPI for operating issues.

Message Authentication

In some embodiments, the present invention provides for positive identification and authentication of end users in a network.

As noted above, in an OTP-based encryption scheme, user authentication is of the essence, because an end user's pad may be misappropriated and/or reproduced by a bad actor and then used to impersonate an actual user of the network.

The one-time pads themselves provide no message authentication, and this lack of an authentication can pose a security threat in real-world applications. The straightforward XORing with the keystream creates a potential vulnerability in message integrity, which is especially simple to exploit. For example, an attacker who knows that a message contains the string, "meet Jane and me tomorrow at 3:30 pm" at a particular point, can replace that content by any other content of the exact same length, such as "3:30 meeting is cancelled, stay home," without having access to the one-time pad.

Accordingly, in some embodiments, the present invention provides for a user authentication pad that is stored by the user and may be used for authenticating and verifying the user, e.g., in case that an original user pad has been misappropriated.

For example, when a user joins a network of the present invention, the user may be assigned a primary authentication one-time pad (PAOTP), which may be provided, e.g., on a physical portable memory device, such as a memory card or disk-on-key. A copy of the PAOTP may also be saved to one or more centralized OTP hubs of the network, and/or may be split among two or more OTP hubs, so that each split is different from other parts. When communicating within the network for the first time, e.g., a portion of the PAOTP may be used for initial identification and authentication. Upon initial authentication, the used portion of the PAOTP may then be discarded. The user may then receive a runtime pad for using in regular ongoing communications through the network. The PAOTP may then be saved by the user in a safe place in case it may be needed again in the future for a two-step authentication of the user.

During ongoing runtime network communications, the user may be identified by using portions of the runtime pad. However, in some cases, there is needed a stronger two-step verification process. For example, a user may wish to revoke the runtime user pad, or the user may be required by the network to update/replace its runtime pad, e.g., in case of suspicious activity. In such cases, the POTP may be used to authenticate the end user.

In some embodiments, universal hashing may also be used as an additional authentication mechanism. The universal hashing mechanism provides a way to authenticate messages up to an arbitrary security bound (i.e., for any p>0, a large enough hash ensures that even a computationally unbounded attacker's likelihood of successful forgery is less than p). However, universal hashing coms at a cost of using additional random data from encryption pads.

Random Numbers Generating

In some embodiments, OTPs for use in connection with the present invention may be generated in a plurality of locations, including, but not limited to, within the OTP hubs, or in a centralized location.

In some embodiments, one or more of the OTP hubs may comprise a device and/or function responsible for generating large amounts of true random data. In some embodiments, random data generation may be based in one or more a physical processes, e.g., based on microscopic phenomena such as thermal noise, the photoelectric effect, other quantum phenomena, chaos mechanics, and/or or any other similar processes. In some embodiments, the present invention may provide for testing the random data generated as described below, e.g., through entropy and similar tests.

Automatic Teller Machines for OTP Delivery

In some embodiments, the present invention may utilize a physical distribution network, such as an automatic teller machine (ATM) and/or similar safe-box mechanism for delivery and distribution of OTPs to end users. For example, such an ATM may dispense an external memory device, such as a disk-on-key, containing the OTP. In some embodiments, an ATM of the present invention may have a hard drive containing the OTPs, dispense to an external memory device, such as a portable memory device (e.g., a flash drive) provided by a user. In some embodiments, an ATM of the present invention may be configured for generating OTPs locally using suitable random data generation hardware, and/or be provided with OTPs generated externally, e.g., through the OTP hubs. The ATM may also be responsible for updating the system's OTP hubs about OTPs distributed to end users.

In some embodiments, one or more of the OTP hubs of the present invention may comprise an ATM, in addition to OTP generating capabilities. Each such OTP hubs may form a standalone physically-secured device which generates and distributes OTPs to end users, and then handles encrypted traffic of the resulting network. Thus, there is enabled the establishing of a centralized OTP encryption scheme from any desired location using one of more such devices.

In some embodiments, standalone ATMs of the present invention may be located in various desired locations, to dispense OTPs as necessary to end users. OTPs may then be generated locally within the ATM, and/or remotely, and securely delivered to the ATMs for further distribution to end users in that location. Secure delivery of OTPs with ATMs may be carried out through Quantum Key distribution (QKD) communication and/or, e.g., physically secured means, such as secure vehicles and/or containers. End users may then access the ATMs to acquire OTPs by, e.g., loading a memory device or exchanging memory devices. Once dispensed to a user, an OTP may be denoted by the system as associated with that user, and used for routing messages to that user.

In some embodiments, OTPs may be delivered directly to OTP hubs and/or end users through QKD and/or physically secured means, such as secure vehicles and/or containers.

QKD is the process of using quantum communication to establish a shared key between two parties without a third-party learning anything about that key, even if the third party can eavesdrop on all communication between the parties. The QKD key may thus be used for delivering OTPs to specific defined destinations of the present system.

OTP Disposal

As noted above, used OTPs must be deleted and disposed to prevent any misappropriation. In some embodiments, OTPs of the present invention may be disposed by overwriting all or portions of an OTP with false data.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising at least one hardware processor, and a non-transitory computer-readable storage medium having stored thereon program instructions, the program instructions executable by the at least one hardware processor to:
    inform at least one network node (B) of an intended communication from an origin node to a destination node via at least one routing hub (A,C) in a computer network;
    receive, by the at least one routing hub (A,C), the communication from the origin node, wherein said communication is encrypted with a one-time pad (OTP) associated with said origin node;
    receive, by said at least one routing hub (A,C) a customized OTP from the at least one network node (B), wherein said customized OTP represents a difference between the OTP associated with the origin node and an OTP associated with the destination node;
    apply, by said at least one routing hub (A,C), to said communication, the customized OTP, to simultaneously (i) encrypt said communication with said OTP associated with said destination node, and (ii) decrypt said communication with said OTP associated with said origin node; and
    deliver said communication to said destination node for decrypting said communication with said OTP associated with said destination node.

2. The system of claim 1, wherein said computer network comprises a plurality of nodes, and wherein each of said nodes stores only an OTP associated with said node.

3. The system of claim 1, wherein said program instructions are further executable to perform network user authentication based, at least in part, on universal hashing.

4. The system of claim 1, wherein at least some of said OTPs are disposed of by overwriting at least a portion thereof using false data.

5. The system of claim 1, wherein delivering the communication to said destination node is based, at least in part, on a routing table, and wherein said routing table takes into account an OTP usage metric, and wherein said OTP usage metric is a Key Performance Indicator (KPI) with respect to said computer network.

6. The system of claim 1, wherein the customized OTP is calculated as a bitwise-XOR between the OTP of the origin node and the OTP of the destination node.

7. The system of any one of claim 1, wherein the customized OTP is calculated as a Vernam-cipher operation between the OTP of the origin node and the OTP of the destination node.

8. The system of claim 1, wherein said at least one routing hub comprises a series of at least two routing hubs (A,C), and wherein, with respect to each pair of routing hubs in said series, wherein applying the customized OTP comprises:

receiving by a first routing hub (A) in said pair, from the at least one network node (B), a first inter-hub customized OTP, configured to simultaneously (i) decrypt said communication with an OTP associated with a preceding hop in a route of said communication, and (ii) encrypt said communication with an OTP associated with a second routing hub in said pair;

applying, by the first routing hub (A) in said pair, to said communication, the first inter-hub customized OTP; and delivering said communication to said second routing hub.

9. The system of claim 8, wherein each of said hops in said route of said communication is one of: a network node, an end user, a server, a remote server, and an end user.

10. The system of claim 8, wherein each of said customized OTPs represent a computed difference between a pair of OTPs.

11. The system of claim 8, wherein said applying further comprises:

receiving, by a second routing hub (C) in said pair, from the at least one network node (D), a second inter-hub customized OTP, configured to simultaneously (iii) encrypt said communication with an OTP associated with a subsequent hop in said route of said communication, and (iv) decrypt said communication with said OTP associated with said second routing hub in said pair;

applying, by the second routing hub (C) in said pair, to said communication, the second inter-hub customized OTP; and delivering said communication to said subsequent hop.

12. The system of claim 8, wherein at least some of said routing hubs further comprise at least one of: a random numbers generator (RNG), and an automated teller machine configured for dispensing OTPs to said computer network users.

13. The system of claim 12, wherein said OTPs are distributed with the automated teller machine using at least one of: Quantum Key distribution (QKD) communication, and physically secured distribution means.

14. A system comprising:
at least one hardware processor; and
a non-transitory computer-readable storage medium having stored thereon program instructions, the program instructions executable by the at least one hardware processor to:

receive, by one-time pad (OTP) hub in a computer network, indication associated with a communication from a first network node to one or more other network nodes, wherein said communication is encrypted with an OTP associated with said first network node;

send, by said OTP hub, a customized OTP to said first network node, wherein said customized OTP represents a difference between the OTP associated with the first network node and an OTP associated with at least one second network node of said other network nodes;

apply, the customized OTP, to simultaneously (i) encrypt, by said first node, said communication with said OTP associated with the at least one second network node, and (ii) decrypt said communication with the OTP associated with the first node; and transmit, by said first node, said communication to the at least one second network node.

15. The system of claim 14, wherein said at least one second node of said one or more network nodes further decrypts said communication with the OTP associated with the at least one second network node.

16. The system of claim 14, wherein said indication is received from any of said network nodes.

17. The system of claim 14, wherein each of said network nodes stores an authentication OTP, and wherein said authentication OTP is configured for use in connection with a two-step user authentication of said network node.

18. The system of claim 14, wherein said OTP hub further comprises at least one of a random numbers generator (RNG), and an automated teller machine configured for dispensing OTPs to said network nodes.

19. The system of claim 14, wherein said OTP is distributed with the automated teller machine using at least one of Quantum Key distribution (QKD) communication, and physically secured distribution means.

* * * * *